United States Patent
Takahashi et al.

(10) Patent No.: US 11,733,362 B2
(45) Date of Patent: Aug. 22, 2023

(54) DISTANCE MEASURING APPARATUS COMPRISING DETERIORATION DETERMINATION OF POLARIZING FILTERS BASED ON A REFLECTED POLARIZED INTENSITY FROM A REFERENCE REFLECTOR

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 980 days.

(21) Appl. No.: 16/384,934

(22) Filed: Apr. 16, 2019

(65) Prior Publication Data
US 2019/0377073 A1    Dec. 12, 2019

(30) Foreign Application Priority Data
Jun. 8, 2018 (JP) ................... 2018-110487

(51) Int. Cl.
| | |
|---|---|
| *G01S 7/499* | (2006.01) |
| *G01B 11/14* | (2006.01) |
| *G01V 8/14* | (2006.01) |
| *G01S 7/481* | (2006.01) |
| *G01S 17/08* | (2006.01) |
| *G01S 17/04* | (2020.01) |

(52) U.S. Cl.
CPC .............. *G01S 7/499* (2013.01); *G01B 11/14* (2013.01); *G01S 7/4816* (2013.01); *G01S 17/04* (2020.01); *G01S 17/08* (2013.01); *G01V 8/14* (2013.01)

(58) Field of Classification Search
CPC .......... G01S 7/499; G01S 17/01; G01S 17/36; G01S 17/04; G01S 17/08; G01S 7/4918; G01B 11/14; G01B 11/026
USPC ................................ 356/356, 5.14; 250/225
See application file for complete search history.

(56) References Cited

U.S. PATENT DOCUMENTS

| | | | | |
|---|---|---|---|---|
| 4,957,362 | A | | 9/1990 | Peterson |
| 4,973,837 | A | * | 11/1990 | Bradbeer .............. G01S 7/4813 250/214 RC |
| 7,738,102 | B2 | * | 6/2010 | Kobayashi ........... G01N 21/958 356/389 |
| 2003/0001119 | A1 | * | 1/2003 | Takezawa ............ G01N 21/952 250/559.45 |
| 2004/0125357 | A1 | * | 7/2004 | Ohtomo .................. G01S 17/08 356/5.13 |
| 2018/0266818 | A1 | * | 9/2018 | Ishinabe ................. G01S 17/86 |

FOREIGN PATENT DOCUMENTS

| | | |
|---|---|---|
| CN | 103997945 A | 8/2014 |
| CN | 105552702 A | 5/2016 |
| DE | 102016201599 A1 | 8/2017 |

(Continued)

*Primary Examiner* — Que Tan Le
*Assistant Examiner* — Mai Thi Ngoc Tran
(74) *Attorney, Agent, or Firm* — Hauptman Ham, LLP

(57) ABSTRACT

A distance-measuring apparatus includes an optical window incorporating a first polarizing filter that polarizes reference light and a second polarizing filter that polarizes incident light in a direction inclined at 90 degrees relative to a polarization direction of the first polarizing filter.

15 Claims, 8 Drawing Sheets

(56) References Cited

FOREIGN PATENT DOCUMENTS

| | | | |
|---|---|---|---|
| JP | 2001-126598 | A | 5/2001 |
| JP | 2001-174557 | A | 6/2001 |
| JP | 2009-300296 | A | 12/2009 |
| JP | 2009300296 | A * | 12/2009 |
| JP | 2010-78339 | A | 4/2010 |
| JP | 2011-69671 | A | 4/2011 |
| JP | 2011069671 | A * | 4/2011 |
| JP | 2016-224021 | A | 12/2016 |
| JP | WO2016/084214 | A1 | 8/2017 |
| WO | 2014/057855 | A1 | 4/2014 |

* cited by examiner

DISTANCE MEASURING APPARATUS COMPRISING DETERIORATION DETERMINATION OF POLARIZING FILTERS BASED ON A REFLECTED POLARIZED INTENSITY FROM A REFERENCE REFLECTOR

RELATED APPLICATIONS

The present application claims priority of Japanese Application Number 2018-110487, filed on Jun. 8, 2018, the disclosure of which is hereby incorporated by reference herein in its entirety.

BACKGROUND OF THE INVENTION

1. Field of the Invention

The present invention relates to a distance-measuring apparatus that measures a distance to an object on the basis of the time of flight of light and in particular to a distance-measuring apparatus with a polarizing filter.

2. Description of the Related Art

Among distance-measuring apparatuses that measure the distance to an object, TOF (time of flight) cameras that output a distance on the basis of the time of flight of light are known. Many TOF cameras employ a phase difference method in which a reference light intensity-modulated at a predefined frequency is radiated to a target space to be measured and the phase difference between the radiated reference light and the light reflected from the target space to be measured is detected.

Such TOF cameras were disadvantageous because a strong reflection from a metallic surface, a retroreflector, and the like caused saturation and resulted in a failure in distance-measuring. Further, since a TOF camera measures a distance on the basis of delay time of a reference light radiated by and returning to the TOF camera itself, an intense reference light can reflect on the lens surface or the like and cause a flare. A method for effectively reducing the effects of metallic reflection or retroreflection was desired so that, even when a metallic reflection or a retroreflection occurs, the distance-measuring may be performed as successfully as for a diffuse reflection.

Objects in this world have various values of diffuse reflectance and the amount of light returning from objects depends on diffuse reflectance. In fact, there are not only objects that diffusely reflect light but also objects having a material or surface that reflects light intensely in a certain direction in, for example, retroreflection or specular reflection. In order to enable measurement of the distances of all these types of objects, it was preferable to capture image several times while adjusting the exposure time, as illustrated in FIG. 8.

Excessively intense light causes irregular reflection in the camera structure and even causes a phenomenon called a flare, which affects not only the pixels that form an image but also their surroundings. This was a serious problem that made the distance-measuring values of the image greatly inaccurate.

To solve such a problem, a technique is known in which effects of strong reflection are curtailed by providing a first polarizing filter to polarize reference light for the light emission section and a second polarizing filter for the light reception section, the second polarizing filter having a polarization direction inclined at 90 degrees relative to that of the first polarizing filter (see, for example, the literature below).

Japanese Unexamined Patent Publication (Kokai) No. 2001-174557 discloses an all-weather optical range finder with a polarizing plate disposed near the light-projecting lens to project light consisting of vertically polarized component and a polarizing plate disposed near the light-receiving lens to receive light consisting solely of horizontally polarized component inclined at 90 degrees from the polarization direction of the projected light.

Japanese Unexamined Patent Publication (Kokai) No. 2010-078339 discloses a three-dimensional shape measurement apparatus that measures the three-dimensional shape of an object by distance-measuring based on a TOF method and prevents the incidence of specular reflection by polarizing the incident light in a direction perpendicular to the polarization direction of the pattern light.

Japanese Unexamined Patent Publication (Kokai) No. 2011-069671 discloses a distance-measuring apparatus with a first polarizing element attached on the outer circumferential surface of the light-projecting window, wherein the first polarizing element polarizes light in a first direction, and with a second polarizing element attached in the optical path of the light reflected from the target object to be detected, wherein the second polarizing element polarizes light in a second direction, which is different from the first direction.

Re-publication of PCT International Publication No. 2016/084214 discloses a biometric authentication apparatus that removes mirror reflection by inclining the polarizing axis of the polarizing filter provided for the light source at 90 degrees relative to the polarizing axis of the polarizing filter provided for the camera.

Japanese Unexamined Patent Publication (Kokai) No. 2016-224021 discloses a depth camera based on a TOF method and equipped with a polarizing plate on the incident side of the camera, the polarizing plate forming a 90 degree angle to a polarizing plate provided on the radiating side, and the camera thereby removes polarization component retroreflected by water vapor and transmits the component of light diffusely reflected by the target object to be observed which component matches the polarization direction of the polarizing plate.

SUMMARY OF INVENTION

According to the principle of distance-measuring, a TOF camera has a photosensitive element and a light-emitting element closely related to each other and the camera is constituted by incorporating the photosensitive element and the light-emitting element. Therefore, the light reception section and the light emission section are clearly defined and it was easy to consider how to attach polarizing filters. However, it was preferable to make fine adjustments of the position and posture in order to maximize the capacity expected of the polarizing filters to remove effects of specular reflection and to have a positioning mechanism for the filters in order to maintain the adjusted polarization directions.

As polarizing filters deteriorate by aging, it is preferable to replace the filters regularly in order to maintain the capacity of the filters to remove effects of specular reflection. Therefore, it is not desirable to firmly fix the polarizing filters in position to prevent the polarizing filters from moving. Further, regularly replacing the polarizing filters before they deteriorate will lead to an increased operation cost. Polarizing filter may be cleaned when they are simply dirty but it is not easy to distinguish the cases of a polarizing filter being deteriorated from the cases of a polarizing filter being dirty to carry out timely replacement.

Thus, a distance-measuring apparatus allowing a simplified maintenance work for the polarizing filters is desired.

According to an aspect of the present disclosure, there is provided a distance-measuring apparatus including: a light emission section that emits reference light intensity-modulated at a predefined frequency; a light reception section that receives incident light from a target space to be measured; a distance calculation section that calculates a distance to an object in the target space to be measured, based on a phase difference between the reference light and the incident light; and an optical window incorporating a first polarizing filter that polarizes the reference light and a second polarizing filter that polarizes the incident light in a direction inclined at 90 degrees relative to a polarization direction of the first polarizing filter.

DETAILED DESCRIPTION

Embodiments of the present disclosure will be described below in detail with reference to the attached drawings. Identical or similar features are denoted by identical or similar reference signs throughout the drawings. The embodiments described below do not limit the technical scope of the invention defined by the claims nor the meanings of the terms used therein.

Figure 1:
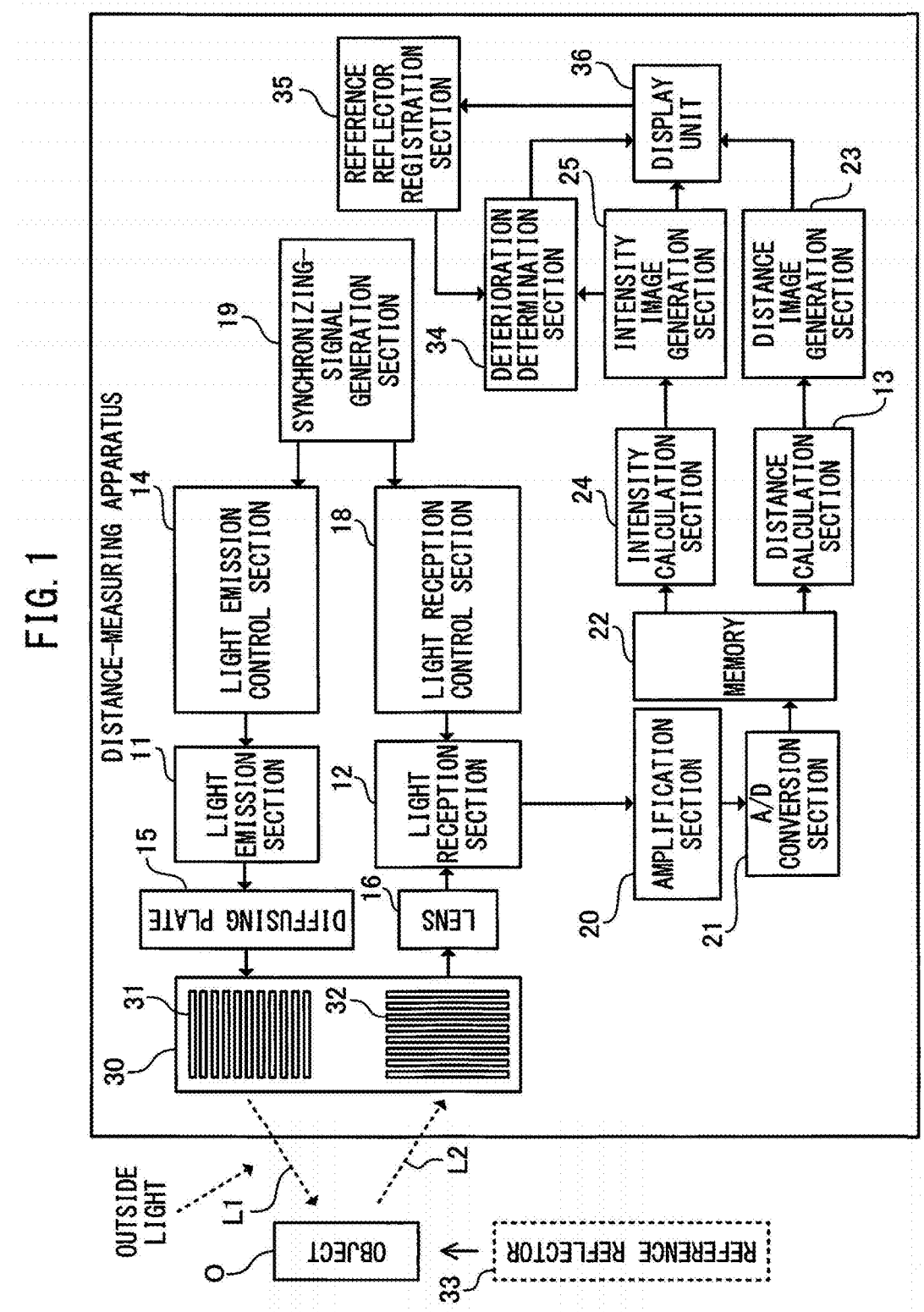
FIG. 1 is a block diagram of a distance-measuring apparatus according to a first embodiment.

FIG. 1 is a block diagram of a distance-measuring apparatus 10 according to a first embodiment. The distance-measuring apparatus 10 is, for example, a TOF camera that measures the distance to an object O by a phase difference method, and includes a light emission section 11 that emits reference light L1, which is radiated to the target space to be measured, a light reception section 12 that receives incident light L2 from the target space to be measured, and a distance calculation section 13 that calculates the distance to the object O in the target space to be measured.

The light emission section 11 includes a light source, such as a light-emitting diode (LED) or a laser diode (LD), that emits near-infrared light (NIR light) and the light emission section 11 emits reference light L1, intensity-modulated at a predefined frequency in accordance with a modulation signal received from a light emission control section 14. The reference light L1 is diffused by a diffusing plate 15 and radiated to the target space to be measured.

The light reception section 12 includes an image sensor such as, for example, a CCD or a CMOS provided with an NIR filter and receives incident light L2 through a lens 16, which may be a condenser lens or the like. The incident light L2 includes outside light in addition to the reference light reflected on the object O. The light reception section 12 includes photosensitive elements that store electric charges in response to the incident light L2. Each of the pixels of the light reception section 12 includes, for example, four photosensitive elements and the four photosensitive elements respectively store electric charges $Q_1$ to $Q_4$ when images are captured at timings with phase differences of, for example, 0°, 90°, 180°, and 270°, respectively, relative to the timing of the light emission of the reference light L1.

The light emission control section 14 and a light reception control section 18 receive synchronizing signals as inputs from a synchronizing-signal generation section 19 at every $\pi/2$ phase. The light emission control section 14 and the light reception control section 18 respectively control the light emission timing of the light emission section 11, the image capturing timing of the light reception section 12, and the like in accordance with the synchronizing signals received as inputs. Light emissions are repeated a plurality of times for each execution of image capturing and the exposure time for image capturing is adjusted by changing the number of times of light emissions.

After an execution of image capturing, the light reception section 12 outputs one frame image containing four electric charge amounts $Q_1$ to $Q_4$ per pixel in accordance with a control signal received from the light reception control section 18. The voltages of the electric charge amounts $Q_1$ to $Q_4$ are amplified by an amplification section 20, A/D converted by an A/D conversion section 21, and stored in memory 22.

The distance calculation section 13 includes a processor such as an ASIC or an FPGA and calculates the distance to an object present in the direction of observation on the basis of the electric charge amounts $Q_1$ to $Q_4$ stored in the memory 22 for each pixel and for each execution of image capturing. The distance calculation section 13 calculates the phase difference Td and the distance L from, for example, the known equation below, where c is the speed of light ($3 \times 10^8$ m/s) and f is a modulation frequency.

$$Td = \arctan\left(\frac{Q_2 - Q_4}{Q_1 - Q_3}\right) \qquad \text{[Math 1]}$$

$$L = \frac{c}{4\pi f} Td \qquad \text{[Math 2]}$$

A distance image generation section 23 generates a distance image based on the distance L calculated for each pixel.

An intensity calculation section 24 includes a processor such as an ASIC or an FPGA and calculates the light reception intensity I on the basis of the electric charge amounts $Q_1$ to $Q_4$ stored in the memory 22 for each pixel and for each execution of image capturing. The intensity calculation section 24 calculates the light reception intensity I from, for example, the known equation below.

$$I = \frac{\sqrt{(Q_1 - Q_3)^2 + (Q_2 - Q_4)^2}}{2} \quad \text{[Math 3]}$$

An intensity image generation section 25 generates an intensity image (NIR image) based on the light reception intensity calculated for each pixel.

In such a distance-measuring apparatus 10, a strong reflection from an object O, which may be a metallic surface, retroreflector, or the like, causes saturation, which results in a failure in distance-measuring. Further, an intense incident light L2 irregularly reflects on the lens 16 and causes a flare, which makes the distance-measuring values inaccurate.

To address this, the distance-measuring apparatus 10 according to the first embodiment includes an optical window 30 on which a first polarizing filter 31 and a second polarizing filter 32 are integrally formed, wherein the first polarizing filter 31 polarizes the reference light L1 and the second polarizing filter 32 polarizes incident light L2 in the direction inclined at 90 degrees relative to the polarization direction of the first polarizing filter 31. Such an optical window 30 produces the following advantageous effects.

(1) The first polarizing filter 31 and the second polarizing filter 32 reduce the intensity of reflection from metals, retroreflectors, and the like and thereby not only prevent a failure in distance-measuring owing to saturation but diminish inaccuracies owing to a flare.

(2) Unlike conventional methods, there is no need for carrying out image capturing a plurality of times while adjusting the exposure time. The number of image capturing modes for changing the exposure time is thus reduced.

(3) As flares occur less frequently, the photosensitive elements have longer lives, which is advantageous.

(4) Since the optical window 30 incorporates the two polarizing filters 31 and 32, the polarization directions of which are 90 degrees inclined from each other, there is no need for adjusting on-site the positions of the polarizing filters on the light-emitting end and the light-receiving end. Further, there is no need for a mechanism to position each filter independently and, even when the optical window 30 is attached to the apparatus without exact precision, the polarizing property is maximized since the positional relation between the two polarizing filters is maintained at 90 degrees.

The distance-measuring apparatus 10 preferably includes the lens 16 between the second polarizing filter 32 and the light reception section 12. The second polarizing filter 32 reduces specular reflection from an object O, which may be a metal, retroreflector, or the like and, as the incident light L2 comes into the lens 16 in a reduced light quantity, irregular reflections on the lens surface and the like are curtailed and flares occur less frequently.

On the other hand, the polarizing filters 31, 32 deteriorate by aging and are preferably replaced regularly in order to maintain accuracy in distance-measuring. Therefore, the optical window 30 is preferably detachable.

Further, in order to warn the user about the timing of replacing the polarizing filters 31, 32, the distance-measuring apparatus 10 may include a reference reflector 33 and a deterioration determination section 34 that makes a determination on deterioration of the first polarizing filter 31 and the second polarizing filter 32 on the basis of the intensity of reflection from the reference reflector 33. The reference reflector 33 includes a retroreflector and the deterioration determination section 34 includes a processor such as an ASIC or an FPGA.

The deterioration determination section 34 determines that the polarizing filters 31, 32 have deteriorated when the intensity of reflection from the retroreflection portion of the reference reflector 33 is greater than a threshold value. The deterioration determination section 34 preferably stores in memory such a threshold value in advance.

In order to allow the deterioration determination section 34 to store in memory the threshold value in advance, the distance-measuring apparatus 10 may include a reference reflector registration section 35 that registers in advance the reference position of the reference reflector 33 and the intensity of reflection at the reference position. The reference reflector registration section 35 includes a processor such as an ASIC or an FPGA and prompts the user to designate a reference position on the image of the reference reflector 33, which is displayed on a display unit 36.

The reference position may be, for example, a reference point corresponding to one pixel or may be, for example, a reference region corresponding to a plurality of pixels. When the reference position is a reference region, the reference reflector registration section 35 registers in advance, for example, the average or median value of the intensities of reflection of a plurality of pixels as a threshold value. The reference position of the reference reflector 33 may be registered as a two-dimensional position on an image or may be registered as a three-dimensional position in a coordinate system of a camera.

Figure 2:
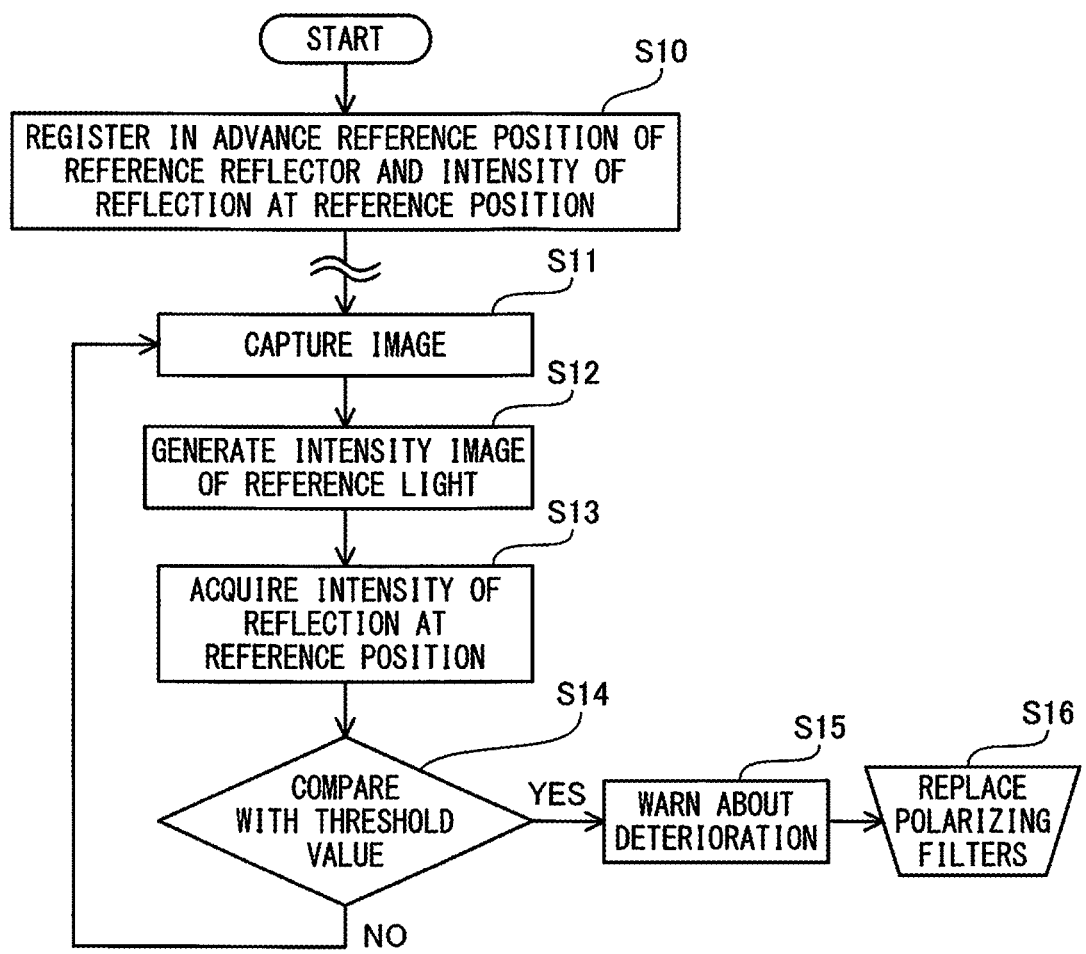
FIG. 2 is a flow chart illustrating processing for determining deterioration of polarizing filters according to the first embodiment.

FIG. 2 is a flow chart illustrating processing for determining deterioration of polarizing filters according to the first embodiment. Step S10 is a default setting executed at the time of manufacture, installation, or the like of the distance-measuring apparatus 10 while Steps S11 to S16 constitute the processing for determining deterioration, regularly executed during the use of the distance-measuring apparatus 10. In Step S10, the reference reflector registration section 35 registers in advance the reference position of the reference reflector 33 on the image and the intensity of reflection at the reference position.

In Step S11, the distance-measuring apparatus 10 captures an image of the reference reflector 33 disposed at a freely selected position. In Step S12, the intensity image generation section 25 generates an intensity image of the reference light.

In Step S13, the deterioration determination section 34 acquires the intensity of reflection at the reference position. In Step S14, the deterioration determination section 34 compares the acquired intensity of reflection with the threshold value. When the intensity of reflection is greater than the threshold value (YES in Step S14), it is determined that the polarizing filters have deteriorated and then in Step S15, the deterioration determination section 34 gives a warning of the deterioration by means of the display unit 36 or the like. In Step S16, the user replaces the optical window 30 with a new optical window.

When the intensity of reflection is not greater than the threshold value in Step S14 (NO in Step S14), it is determined that the polarizing filters have not deteriorated, the processing returns to Step S11, and the processing for determining deterioration is executed again during the next maintenance work.

The processing for determining deterioration according to the first embodiment allows a determination of deterioration of the polarizing filters 31, 32 and, by replacing the optical window 30, the capacity to remove the specular reflection component is maintained.

Figure 3:
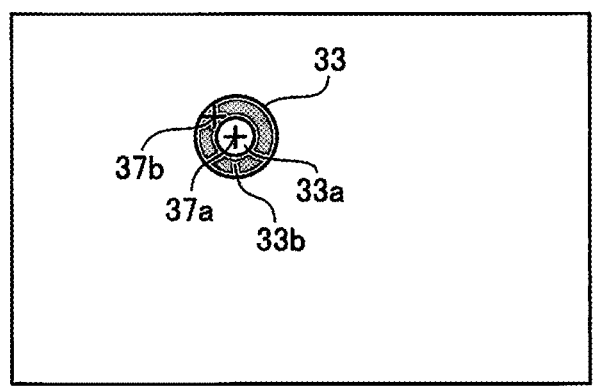
FIG. 3 illustrates a reference reflector according to a second embodiment.

FIG. 3 illustrates a reference reflector 33 according to a second embodiment. Note that the distance-measuring apparatus according to the second embodiment includes a reference reflector, a reference reflector registration section, and a deterioration determination section that are different from those according to the first embodiment but the other features and processing are identical to those of the first embodiment.

When the polarizing filters 31, 32 have deteriorated, the capacity of the polarizing filters to polarize light declines, resulting in an ineffective polarization, and the intensity of reflection from an object O, which is a metal or retroreflector, increases. However, there are cases where the intensity of reflection does not increase even when the polarizing filters have deteriorated, because of the effects of dirt and the like on the optical window 30. To address this, the reference reflector 33 according to the second embodiment includes not only a retroreflection portion 33a but also a diffuse reflection portion 33b. As the intensity of reflection from the diffuse reflection portion 33b decreases when the optical window 30 has dirt and the like, the deterioration of the polarizing filters is determined more accurately on the basis of the intensity of reflection from the retroreflection portion 33a and the intensity of reflection from the diffuse reflection portion 33b. The retroreflection portion 33a and the diffuse reflection portion 33b are not limited in any way and may be, for example, concentrically disposed perfect circles.

The deterioration determination section 34 determines deterioration of the polarizing filters by, for example, comparing the ratio between the intensity of reflection from the retroreflection portion 33a and the intensity of reflection from the diffuse reflection portion 33b with a threshold value. In another embodiment, the determination of deterioration of the polarizing filters may be made by comparing the difference between the intensity of reflection from the retroreflection portion 33a and the intensity of reflection from the diffuse reflection portion 33b with a threshold value.

In order to allow the deterioration determination section 34 to store in memory the threshold value in advance, the reference reflector registration section 35 registers in advance the reference position 37a of the retroreflection portion 33a and the reference position 37b of the diffuse reflection portion 33b as well as the respective intensities of reflection at the reference positions 37a, 37b. Each of the reference positions 37a, 37b may be a reference point corresponding to one pixel or may be a reference region corresponding to a plurality of pixels. When each of the reference positions 37a, 37b is a reference region, the reference reflector registration section 35 registers in advance, for example, the average or median value of the intensities of reflection of a plurality of pixels.

Further, since the intensity of reflection from the diffuse reflection portion 33b changes according to the distance from the distance-measuring apparatus 10 to the reference reflector 33, the reference reflector 33 is disposed at the same distance from the distance-measuring apparatus 10 at the time of registration and at the time of deterioration determination.

Figure 4:
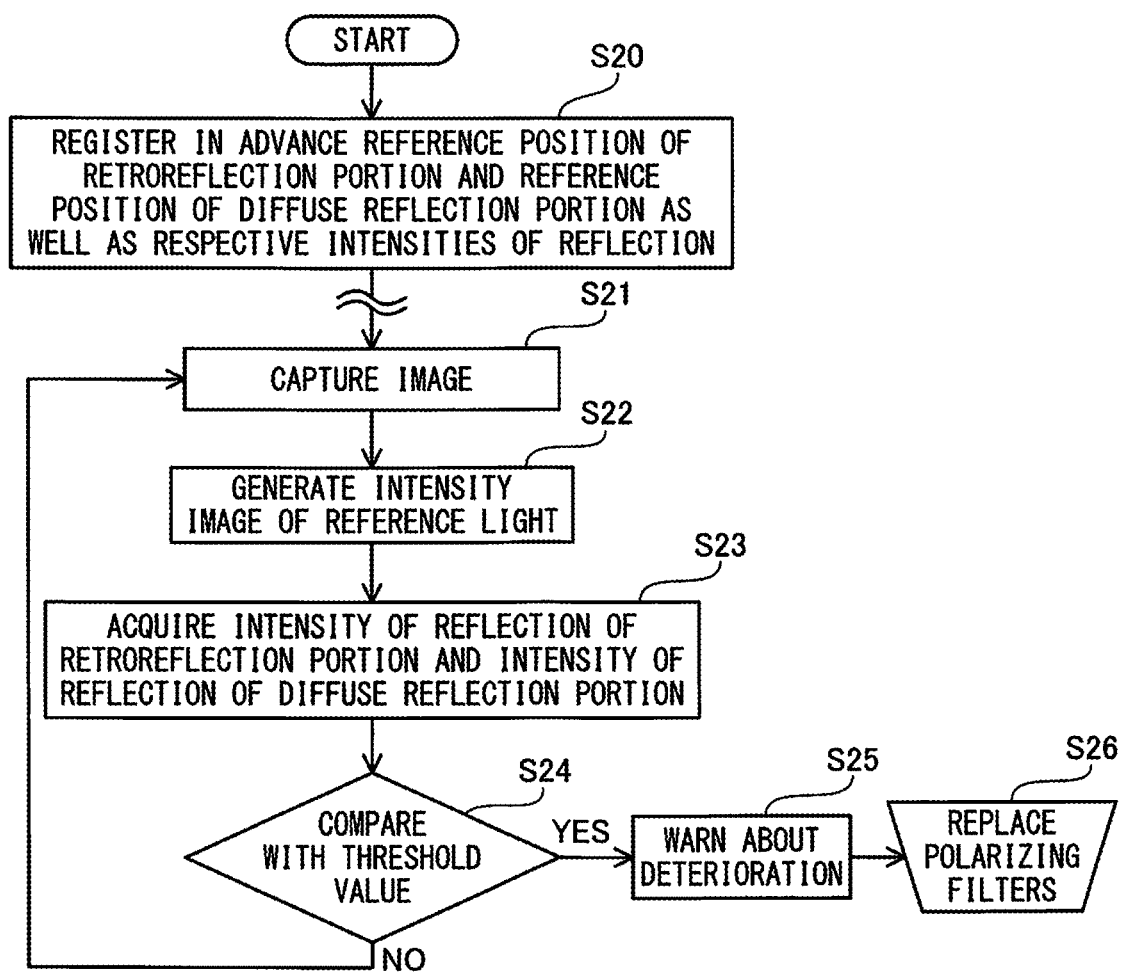
FIG. 4 is a flow chart illustrating processing for determining deterioration of polarizing filters according to the second embodiment.

FIG. 4 is a flow chart illustrating processing for determining deterioration of polarizing filters according to the second embodiment. Step S20 is a default setting executed at the time of manufacture, installation, or the like of the distance-measuring apparatus 10 while Step S21 to Step S26 constitute the processing for determining deterioration, regularly executed during the use of the distance-measuring apparatus 10. In Step S20, the reference reflector registration section 35 registers in advance the reference position 37a of the retroreflection portion 33a and the reference position 37b of the diffuse reflection portion 33b on the image as well as the respective intensities of reflection at the reference positions 37a, 37b.

Step S21, the distance-measuring apparatus 10 captures an image of the reference reflector 33 disposed at a predefined position. In Step S22, the intensity image generation section 25 generates an intensity image of the reference light.

In Step S23, the deterioration determination section 34 acquires the intensity of reflection at the reference position 37a of the retroreflection portion 33a and the intensity of reflection at the reference position 37b of the diffuse reflection portion 33b. In Step S24, the deterioration determination section 34 compares the relation between the acquired intensities of reflection (for example, the ratio between the intensities of reflection) with the threshold value. When the relation between the intensities of reflection is greater than the threshold value (YES in Step S24), it is determined that the polarizing filters have deteriorated and then in Step S25, the deterioration determination section 34 gives a warning of the deterioration by means of the display unit 36 or the like. In Step S26, the user replaces the optical window 30 with a new optical window.

When the relation between the intensities of reflection is not greater than the threshold value in Step S24 (NO in Step S24), it is determined that the polarizing filters have not deteriorated, the processing returns to Step S21, and the processing for determining deterioration is executed again during the next maintenance work.

The processing for determining deterioration according to the second embodiment allows a more accurate determination of deterioration of the polarizing filters 31, 32 and timely replacement of the optical window 30.

Figure 5:
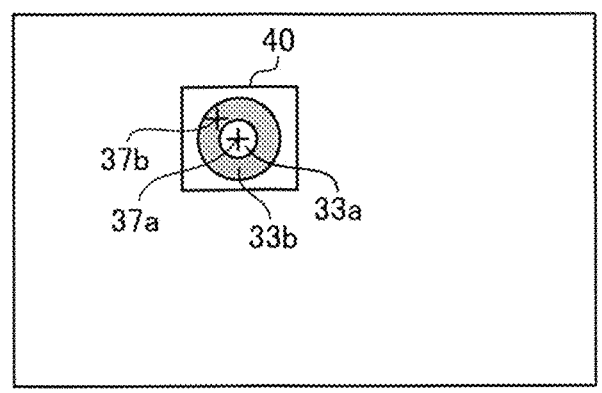
FIG. 5 illustrates a reference reflector according to a third embodiment.

FIG. 5 illustrates a reference reflector 40 according to a third embodiment. Note that the distance-measuring apparatus according to the third embodiment includes a reference reflector, a reference reflector registration section, and a deterioration determination section that are different from those in the first and the second embodiments but the other features and processing are identical to those of the first and the second embodiments.

The reference reflector 40 according to the third embodiment has either a predefined shape or a shape registered in advance and the deterioration determination section 34 searches the image for the shape of the reference reflector 40 and identifies the retroreflection portion 33a and the diffuse reflection portion 33b on the basis of the position and posture of the shape. This allows the reference reflector 40 to be disposed at any position. The reference reflector 40 is not limited to a particular shape and may be, for example, a square.

Since the intensity of reflection from the diffuse reflection portion 33b changes according to the distance from the distance-measuring apparatus 10 to the reference reflector 33, the reference reflector registration section 35 registers in advance the respective intensities of reflection of the retroreflection portion 33a and the diffuse reflection portion 33b at predefined distances (for example, 0.5 m, 1 m, 1.5 m, 2 m).

Figure 6:
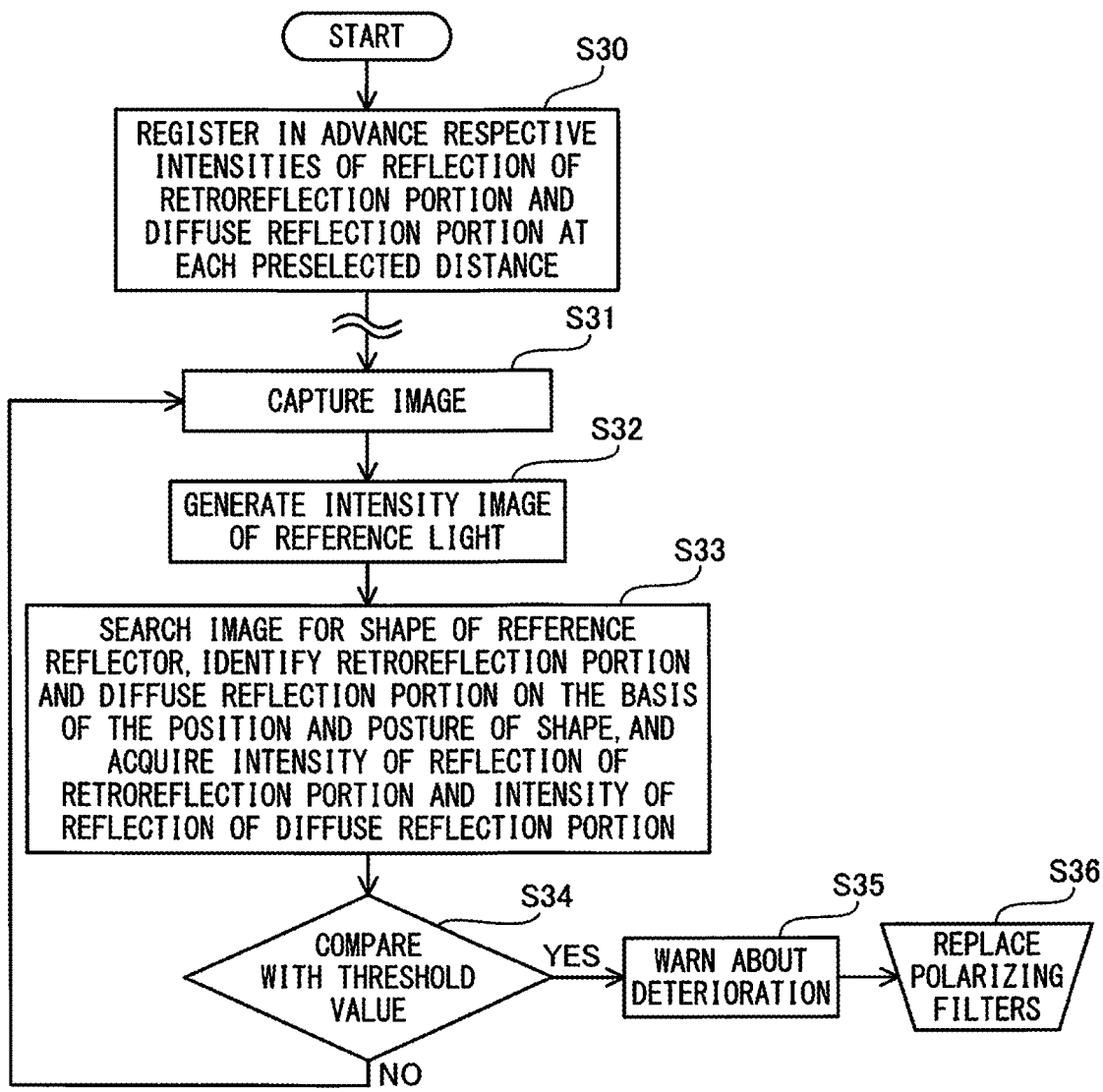
FIG. 6 is a flow chart illustrating processing for determining deterioration of polarizing filters according to the third embodiment.

FIG. 6 is a flow chart illustrating processing for determining deterioration of polarizing filters according to the third embodiment. Step S30 is a default setting executed at the time of manufacture, installation, or the like of the distance-measuring apparatus 10 while Step S31 to Step S36 constitute the processing for determining deterioration, regularly executed during the use of the distance-measuring apparatus 10. In Step S30, the reference reflector registration section 35 registers in advance respective intensities of reflection of the retroreflection portion 33a and the diffuse reflection portion 33b at each predefined distance. Note that in Step S30 the reference reflector registration section 35 may register in advance the shape of the reference reflector 40.

In Step S31, the distance-measuring apparatus 10 captures an image of the reference reflector 40 disposed at a freely selected position. In Step S32, the intensity image generation section 25 generates an intensity image of the reference light.

In Step S33, the deterioration determination section 34 searches the image for the shape of the reference reflector 40 by applying image processing technique such as template matching, identifies the retroreflection portion 33a and the diffuse reflection portion 33b on the basis of the position and posture of the shape, and acquires the intensity of reflection of the retroreflection portion 33a and the intensity of reflection of the diffuse reflection portion 33b.

In Step S34, the deterioration determination section 34 compares the relation between the acquired intensities of reflection (for example, the ratio between the intensities of reflection) with the threshold value. When the relation between the intensities of reflection is greater than the threshold value (YES in Step S34), it is determined that the polarizing filters have deteriorated and then in Step S35, the deterioration determination section 34 gives a warning of the deterioration by means of the display unit 36 or the like. In Step S36, the user replaces the optical window 30 with a new optical window.

When the relation between the intensities of reflection is not greater than the threshold value in Step S34 (NO in Step S34), it is determined that the polarizing filters have not deteriorated, the processing returns to Step S31, and the processing for determining deterioration is executed again during the next maintenance work. Further, a warning and the like may be displayed when no deterioration determination has been made for a certain period.

The processing for determining deterioration according to the third embodiment eliminates the need for registering in advance the reference position 37a and the reference position 37b of the reference reflector 40 and allows the reference reflector 40 to be disposed at any position, and thus simplifies the determination of deterioration of the polarizing filters.

Figure 7:
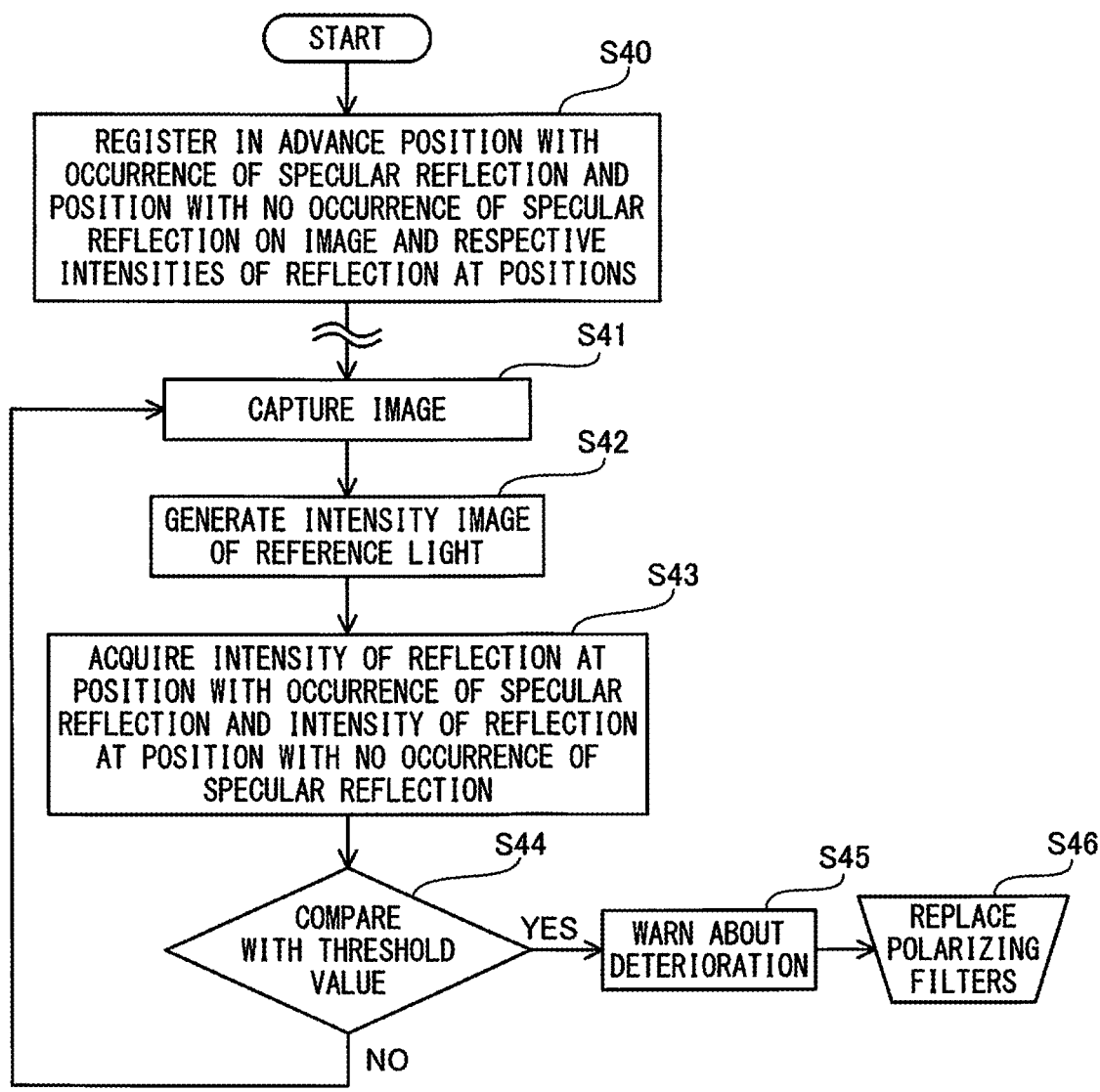
FIG. 7 is a flow chart illustrating processing for determining deterioration of polarizing filters according to a fourth embodiment.
Figure 8:
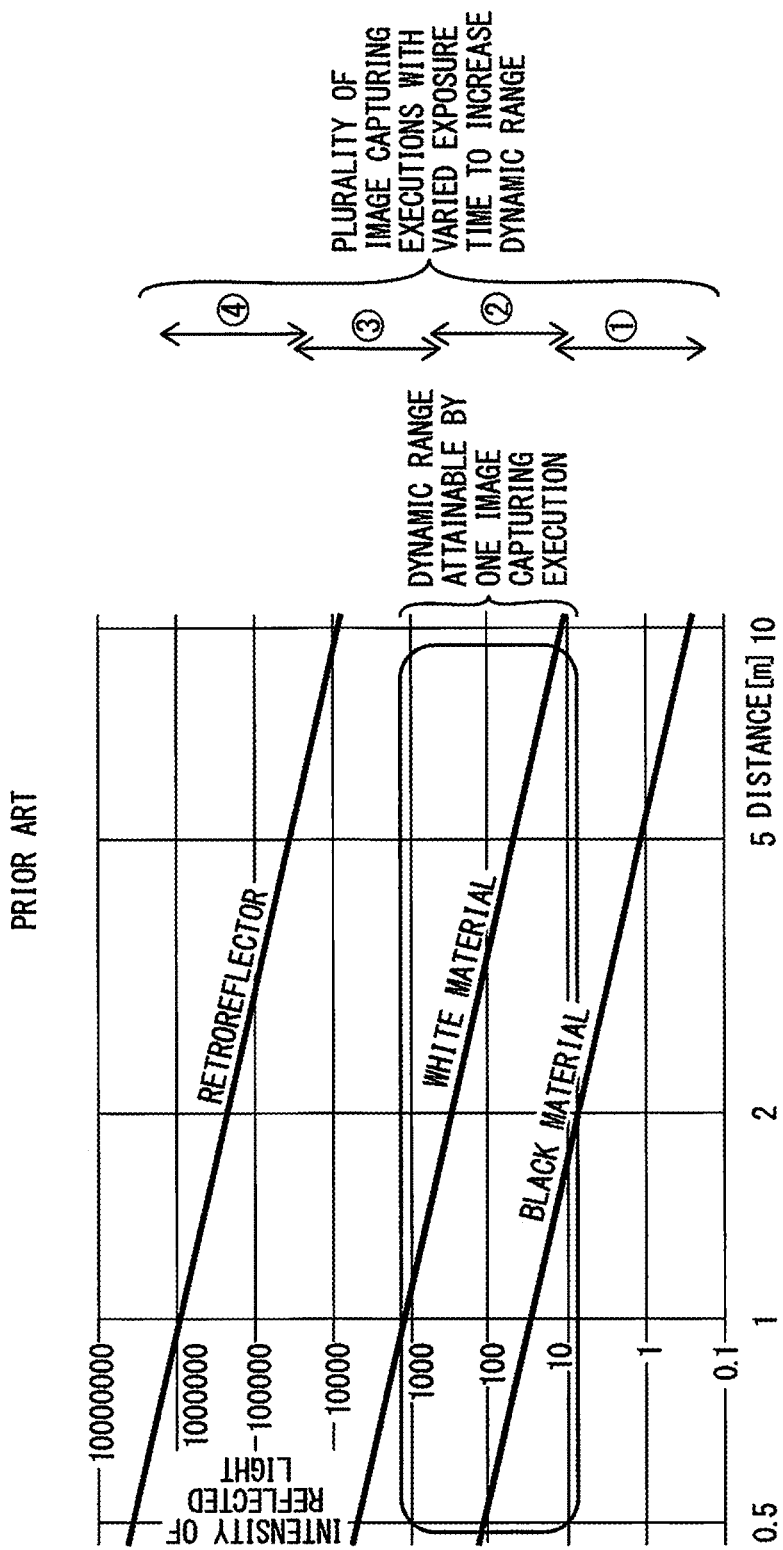
FIG. 8 illustrates a conventional image capturing mode with varied exposure time.

FIG. 7 is a flow chart illustrating processing for determining deterioration of polarizing filters according to a fourth embodiment. Note that the distance-measuring apparatus according to the fourth embodiment includes a reference reflector, a reference reflector registration section, and a deterioration determination section that are different from those in the first to the third embodiments but the other features and processing are identical to those of the first to the third embodiments.

The reference reflector according to the fourth embodiment need not be a reflector particularly designed but may be any reflector that at least produces specular reflection, for example, a metal plate. In order to allow the deterioration determination section 34 to store in memory the threshold value, the reference reflector registration section 35 registers in advance a position at which a specular reflection has occurred on the image, a position at which no specular reflection has occurred, and the respective intensities of reflection at the positions. The deterioration determination section 34 determines deterioration of the polarizing filters on the basis of the intensity of reflection at the position with an occurrence of specular reflection and the intensity of reflection at the position with no occurrence of specular reflection.

The position with an occurrence of specular reflection and the position with no occurrence of specular reflection may be reference points each corresponding to one pixel or may be reference regions each corresponding to a plurality of pixels. When the position with an occurrence of specular reflection and the position with no occurrence of specular reflection are respectively reference regions, the reference reflector registration section 35 registers in advance, for example, the average or median value of the intensities of reflection of a plurality of pixels.

Step S40 is a default setting executed at the time of manufacture, installation, or the like of the distance-measuring apparatus 10 while Step S41 to Step S46 constitute the processing for determining deterioration, regularly executed during the use of the distance-measuring apparatus 10. In Step S40, the reference reflector registration section 35 registers in advance the position with an occurrence of specular reflection and the position with no occurrence of specular reflection on the image and the respective intensities of reflection at the positions.

In Step S41, the distance-measuring apparatus 10 captures an image of the reference reflector disposed at a predefined position and posture. In Step S42, the intensity image generation section 25 generates an intensity image of the reference light.

In Step S43, the deterioration determination section 34 acquires the intensity of reflection at the position with an occurrence of specular reflection and the intensity of reflection at the position with no occurrence of specular reflection. In Step S44, the deterioration determination section 34 compares the relation between the acquired intensities of reflection (for example, the ratio between the intensities of reflection) with the threshold value. When the relation between the intensities of reflection is greater than the threshold value (YES in Step S44), it is determined that the polarizing filters have deteriorated and then in Step S45, the deterioration determination section 34 gives a warning of the deterioration by means of the display unit 36 or the like. In Step S46, the user replaces the optical window 30 with a new optical window.

When the relation between the intensities of reflection is not greater than the threshold value in Step S44 (NO in Step S44), it is determined that the polarizing filters have not deteriorated, the processing returns to Step S41, and the processing for determining deterioration is executed again during the next maintenance work.

The processing for determining deterioration according to the fourth embodiment eliminates the need for a reflector particularly designed and thus simplifies the deterioration determination.

Although various embodiments have been described herein, it should be understood that the present invention is not limited to the above-described embodiments and various modifications can be made within the scope of the invention defined in the appended claims.

The invention claimed is:
1. A distance-measuring apparatus comprising:
   a light emission section that emits reference light intensity-modulated at a predefined frequency;
   a light reception section that receives incident light from a target space to be measured;

a distance calculation section that calculates a distance to an object in the target space to be measured, based on a phase difference between the reference light and the incident light; and an optical window having a first polarizing filter that polarizes the reference light and a second polarizing filter that polarizes the incident light in a direction inclined at 90 degrees relative to a polarization direction of the first polarizing filter;

a reference reflector configured to reflect the reference light polarized by the first polarizing filter; and a deterioration determination section configured to determine deterioration of both of the first polarizing filter and the second polarizing filter, based on an intensity of reflection, from the reference reflector, of the incident light polarized by the second polarizing filter and received by the light reception section.

2. The distance-measuring apparatus according to claim 1, further comprising a lens between the second polarizing filter and the light reception section.

3. The distance-measuring apparatus according to claim 1, wherein the optical window is detachable.

4. The distance-measuring apparatus according to claim 1, wherein the reference reflector comprises a retroreflection portion.

5. The distance-measuring apparatus according to claim 4, wherein the reference reflector further comprises a diffuse reflection portion.

6. The distance-measuring apparatus according to claim 5, wherein the deterioration determination section is configured to determine the deterioration, based on an intensity of reflection from the retroreflection portion and an intensity of reflection from the diffuse reflection portion.

7. The distance-measuring apparatus according to claim 1, further comprising a reference reflector registration section configured to register in advance a reference position of the reference reflector on an image and an intensity of reflection from the reference position.

8. The distance-measuring apparatus according to claim 6, wherein the deterioration determination section is configured to search an image for a shape of the reference reflector and identify the retroreflection portion and the diffuse reflection portion, based on a position and posture of the shape.

9. The distance-measuring apparatus according to claim 1, further comprising a reference reflector registration section configured to register a shape of the reference reflector.

10. The distance-measuring apparatus according to claim 8, wherein the shape of the reference reflector is a predefined shape.

11. The distance-measuring apparatus according to claim 7, wherein the reference position comprises a position at which a specular reflection has occurred and a position at which no specular reflection has occurred.

12. The distance-measuring apparatus according to claim 4, wherein the retroreflection portion does not incline the direction of polarization of the incident light.

13. The distance-measuring apparatus according to claim 1, wherein the first polarizing filter and the second polarizing filter are integrally formed on the optical windows.

14. The distance-measuring apparatus according to claim 5, wherein the retroreflection portion and the diffuse reflection portion are concentrical with each other.

15. The distance-measuring apparatus according to claim 1, wherein the light reception section comprises a plurality of photosensitive elements arranged in two-dimensional positions and configured to store electric charges in response to the incident light when images are captured.

\* \* \* \* \*